United States Patent
Eggler et al.

(10) Patent No.: US 9,188,088 B2
(45) Date of Patent: Nov. 17, 2015

(54) ACTUATING DRIVE, EXHAUST GAS RECIRCULATING VALVE, TURBOCHARGER

(75) Inventors: Jochen Eggler, Stuttgart (DE); Gerd Kissner, Stuttgart (DE); Maximiliano Cicciarella, Ditzingen (DE); Robert Ragogna, Villach (AT); Werner Schadler, Seggauberg (AT)

(73) Assignee: Mahle International GmbH (DE)

( * ) Notice: Subject to any disclaimer, the term of this patent is extended or adjusted under 35 U.S.C. 154(b) by 422 days.

(21) Appl. No.: 13/701,895

(22) PCT Filed: Jun. 1, 2011

(86) PCT No.: PCT/EP2011/059045
§ 371 (c)(1),
(2), (4) Date: Feb. 19, 2013

(87) PCT Pub. No.: WO2011/151375
PCT Pub. Date: Dec. 8, 2011

(65) Prior Publication Data
US 2013/0139503 A1    Jun. 6, 2013

(30) Foreign Application Priority Data
Jun. 4, 2010    (DE) .......................... 10 2010 022 736

(51) Int. Cl.
*F02M 25/07* (2006.01)
*F16K 31/04* (2006.01)
(Continued)

(52) U.S. Cl.
CPC ......... *F02M 25/077* (2013.01); *F02M 25/0773* (2013.01); *F02M 25/0789* (2013.01); *F16K 31/047* (2013.01); *F16K 31/52408* (2013.01); *F16K 31/53* (2013.01); *Y02T 10/121* (2013.01)

(58) Field of Classification Search
CPC .......... F02M 25/0773; F02M 25/0772; F02M 25/0771; F02M 25/079; F02M 25/0789; F02B 37/186; F02B 37/183
USPC ............... 123/568.23, 568.24, 568.26, 559.1; 251/129.01, 129.13
See application file for complete search history.

(56) References Cited

U.S. PATENT DOCUMENTS 3,254,660 A * 6/1966 Ray ............................... 137/66
6,382,195 B1 * 5/2002 Green et al. ............. 123/568.23
(Continued)

FOREIGN PATENT DOCUMENTS

DE 102007054769 A1 5/2009
EP 1 028 249 A2 8/2000
(Continued)

OTHER PUBLICATIONS

English Abstract for JP H11201188.
(Continued)

*Primary Examiner* — Mahmoud Gimie
(74) *Attorney, Agent, or Firm* — Fishman Stewart Yamaguchi PLLC

(57) ABSTRACT

An actuating drive for an adjustable actuating element may include an actuator for producing drive forces. A toggle lever may be connected to the actuating element by a first toggle lever joint. A force transmission may connect the actuator to the toggle lever. An output-side output element may be mounted pivotably on a supporting housing section of the actuating drive. The toggle lever may be connected to the output element by a second toggle lever joint. A transverse support may be oriented transversely to a linear movement direction and configured to support at least one of the toggle lever and the actuating element on a guiding housing section of the actuating device.

29 Claims, 6 Drawing Sheets

(51) Int. Cl.
*F16K 31/524* (2006.01)
*F16K 31/53* (2006.01)

(56) References Cited

U.S. PATENT DOCUMENTS

| | | | |
|---|---|---|---|
| 6,823,854 B2* | 11/2004 | Bellon | 123/568.23 |
| 6,886,546 B1 | 5/2005 | Bircann et al. | |
| 7,267,139 B2* | 9/2007 | Blomquist et al. | 137/607 |
| 8,485,498 B2* | 7/2013 | Takeda et al. | 251/129.04 |
| 2002/0078934 A1* | 6/2002 | Hohkita et al. | 123/564 |
| 2007/0163554 A1* | 7/2007 | Bircann et al. | 123/568.23 |
| 2010/0176325 A1 | 7/2010 | Klipfel et al. | |
| 2010/0319663 A1 | 12/2010 | Gracner et al. | |
| 2011/0023838 A1* | 2/2011 | Tschaler et al. | 123/568.2 |

FOREIGN PATENT DOCUMENTS

| | | |
|---|---|---|
| EP | 2172682 A1 | 4/2010 |
| JP | H11201188 A | 7/1999 |
| WO | WO-02/095209 A1 | 11/2002 |
| WO | WO-2008/044292 A1 | 4/2008 |
| WO | WO 2009092422 A1 * | 7/2009 |

OTHER PUBLICATIONS

English Abstract for WO 2008/044292.

Office Action for Japanese Application No. 2013-512888, dated Jan. 6, 2015, 21 pp.

* cited by examiner

ACTUATING DRIVE, EXHAUST GAS RECIRCULATING VALVE, TURBOCHARGER

CROSS-REFERENCE TO RELATED APPLICATIONS

This application claims priority to German Patent Application 10 2010 022 736.6, filed on Jun. 4, 2010, and International Patent Application PCT/EP2011/059045, filed on Jun. 1, 2011, both of which are hereby incorporated by reference in their entirety.

TECHNICAL FIELD

The present invention relates to an actuating drive for a bidirectionally adjustable actuating element, in particular for an exhaust gas recirculating device or for an exhaust gas turbocharger, having the features of the preamble of Claim 1. The invention also relates to an exhaust gas recirculating valve equipped with such an actuating drive and to an exhaust gas turbocharger equipped with such an actuating drive.

BACKGROUND

An actuating drive of this type is known from DE 10 2007 054 769 A1. It comprises an actuator designed as an electric motor for generating drive forces and a toggle lever, which is connected to the actuating element by means of a first toggle lever joint. A force transmission arrangement is also provided, which connects the actuator to the toggle lever for the purpose of force transmission. An output-side output element of said force transmission arrangement is mounted pivotably on a support housing section of the actuating element, while the toggle lever is connected in an articulated manner to the output element by means of a second toggle lever joint.

With the known actuating element, the output element is formed by a segment-like toothed element, which can be pivoted about a pivot axis. When the toothed element is pivoted, the second toggle lever joint is moved out of a region which aligns with the movement direction of the actuating element. The toggle lever pivots and drives the actuating element thereby.

It has been shown that the deflection of the toggle lever in the region of the second toggle lever joint out of the movement direction of the actuating element results in transverse forces in the toggle lever, which the latter transmits to the actuating element via the first toggle lever joint. A transverse force load thus occurs in the actuating element, which leads to increased wear.

SUMMARY

The present invention is concerned with the problem of specifying an improved embodiment for an actuating drive of the type mentioned at the start, which is characterised in particular by a long service life.

This problem is solved according to the invention by the subject matter of the independent claims. Advantageous embodiments form the subject matter of the dependent claims.

The invention is based on the general idea of realising a transverse support between the toggle lever or actuating element and a guiding housing section. This transverse support can absorb transverse forces running in a supporting direction oriented transversely to the movement direction of the actuating element, so that the disruptive transverse forces are ultimately significantly reduced in the actuating element. The proposed transverse force support leads to a transverse force decoupling of the actuating element, as the transverse forces conducted from the toggle lever to the first toggle joint are largely or completely absorbed by the guiding housing section. The guiding housing section forms a part of the actuating drive or of a housing of the actuating drive.

According to a preferred embodiment, the transverse support can be arranged in the region of the first toggle lever joint. This transverse support in the region of the first toggle lever joint is arranged in a targeted manner at the location of transverse force transmission between the toggle lever and the actuating element and is thereby particularly effective.

According to an advantageous embodiment, joint axes of the two toggle lever joints and a pivot axis of the output element can run parallel to each other and perpendicularly to the linear movement direction of the actuating element, the supporting direction running perpendicularly to the movement direction and perpendicularly to the joint axes. This design produces a defined direction of effect for the transverse forces conducted from the toggle lever to the first toggle lever joint, as a result of which the proposed support is simplified.

In another embodiment the guiding housing section can have at least on one side of an adjustment region of the first toggle lever joint two guiding track sections which run parallel to the movement direction of the actuating element and have a distance from each other and on which a guiding body slides or rolls, which is arranged in a stationary manner in relation to the first toggle lever joint. With the aid of these guiding track sections, the desired transverse support is realised while at the same time a longitudinal guide is realised for the first toggle lever joint parallel to the movement direction of the actuating element.

In a specific development, the respective guide body can be designed as a roller or as a rolling bearing, so that it rolls on at least one guide track section. This produces a reduced-friction axial guide of the actuating element and/or of the toggle lever in the region of the first toggle lever joint. The respective rolling bearing can expediently have an inner ring which is connected to the first toggle lever joint, an outer ring which rolls on at least one guiding track section, and rolling bodies, e.g. balls or rollers, arranged between the inner ring and the outer ring. Such rolling bearings can be realised in a virtually play-free manner, so a particularly low-friction axial guide can be realised. In this case an embodiment in which the distance between the two parallel guiding track sections is greater than an outer diameter of the guiding body, in particular than an outer diameter of the roller or of the rolling bearing, preferably of the outer ring, is advantageous. This ensures that the guiding body is always in contact with only one of the two guiding track sections, which reduces friction. If the guiding body is designed as a rolling bearing or roller, rolling is ensured on one guiding track section, while freewheeling is realised on the other guiding track section.

An embodiment in which the respective guiding body is supported along one guiding track section during transmission of compressive force between the toggle lever and the actuating element and is supported along the other guiding track section during transmission of tensile force between the toggle lever and the actuating element is particularly advantageous. The transverse forces oriented in the opposite direction which occur in the two stroke directions of the actuating element can thus be supported on separate, mutually opposite guiding track sections.

The two guiding track sections can expediently be connected to each other via a connecting track section to form a cohesive, U-shaped guiding track. The connecting track section can in particular be designed in such a manner that the guiding body slides or rolls along the connecting track section at a turning point or dead point of the adjustment movement of the actuating element during the transition between transmission of compressive force and transmission of tensile force and changes from one guiding track section to the other guiding track section in terms of support. Owing to this design, the respective guiding body always remains in contact with the guiding housing section, namely alternating and merging into each other on one guiding track section, on the connecting track section and on the other guiding track section. The permanent contact between the guiding body and the guiding housing section means that noise and a risk of damage can be reduced, which is increased if the respective guiding body impacts a guiding contour. It is clear that even relatively short lifting movements can be executed, which do not reach the dead point of the kinematics and nevertheless can represent a turning point in the movement.

It is particularly advantageous if two such guiding track sections and one such guiding body are provided in each case on two diametrically opposite sides of the adjustment region of the first toggle lever joint. This produces symmetrical support for the actuating element, which is moreover moment-free in relation to a longitudinal centre axis of the actuating element.

The actuating element can be connected fixedly to a plate in the region of the first toggle lever joint, as a result of which it is particularly easily possible to transmit forces to the actuating element in the region of the first toggle lever joint.

According to an advantageous development, a restoring spring can furthermore be provided, which is supported on the plate on one side and on the guiding housing section on the other side and which drives the actuating element into an output position. Additional functionality is integrated in the actuating drive in the region of the transverse support by means of this measure. This makes the actuating drive comparatively compact.

A development in which the plate is formed integrally on an actuating element head to which an actuating element rod is fastened is particularly advantageous. The actuating element thus consists of at least two parts, which are fastened to each other to form the actuating element. In addition or alternatively, it can be provided for the plate to be ring-shaped and connected to the actuating element or to an actuating element head of the actuating element by means of two diametrically opposite webs. These webs can be guided laterally on the guiding housing section in one guiding gap each. This produces additional transverse support of the actuating element in the region of the first toggle lever joint.

The first toggle lever joint can be formed on the actuating element head according to an advantageous configuration. In addition or alternatively, the webs can engage through the guiding gaps, so that the first toggle lever joint is arranged on the inside of the guiding housing section, while the restoring spring is arranged on the outside of the guiding housing section. In addition or alternatively, the webs can be oriented parallel to the supporting direction. In addition or alternatively, the respective guiding body or the two diametrically opposite guiding bodies can be arranged on a joint shaft of the first toggle lever joint. The above-mentioned measures can be realised alternatively or cumulatively or in any desired combination in order to simplify the construction of the actuating drive.

The force transmission arrangement can purely by way of example be a toothed gearing system. The output element is then expediently a toothed element, in particular a gearwheel segment, which extends for example over approximately 90° or more or less, without restriction of generality. The guiding housing section and the support housing section can in particular be integrally formed on an actuating drive housing.

In another embodiment, the transverse support can have at least two guiding pins which are arranged in a distributed manner in the circumferential direction in relation to the direction of movement and support the plate and thus the actuating element in a guided manner on the guiding housing section parallel to the direction of movement. Particularly reliable axial guiding parallel to the direction of movement can be realised with the aid of the guiding pins.

According to a development, the respective guiding pin can be adjusted in a guided manner parallel to the direction of movement in a guiding bushing which is arranged on the plate, which improves guiding.

In addition or alternatively, it can be provided for the respective guiding pin to be held and/or adjustable in a guided manner in a pin opening on the guiding housing section. This also allows reliable and simply constructed guiding.

According to a further particular embodiment, the transverse support can have at least one rolling body bearing or a roller bearing, which is arranged on the guiding housing section and is supported on the actuating element. The actuating element is guided directly laterally thereby. The respective bearing has an extremely low coefficient of friction, so the free movement of the actuating element and of the actuating drive is not adversely affected.

According to an advantageous development, a plurality of rolling body bearings or roller bearings can be arranged in a distributed manner in the circumferential direction in relation to the direction of movement, which provides stable side support and guiding on all sides.

In another development, the respective rolling body bearing or the respective roller bearing can have a rotation axis about which rolling bodies of the rolling body bearing rotate or a roller of the roller bearing rotates and which is oriented transversely to the direction of movement. This further improves the guiding effect and supporting effect.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components.

BRIEF DESCRIPTION OF THE DRAWINGS

In the figures.

DETAILED DESCRIPTION

Figure 1:
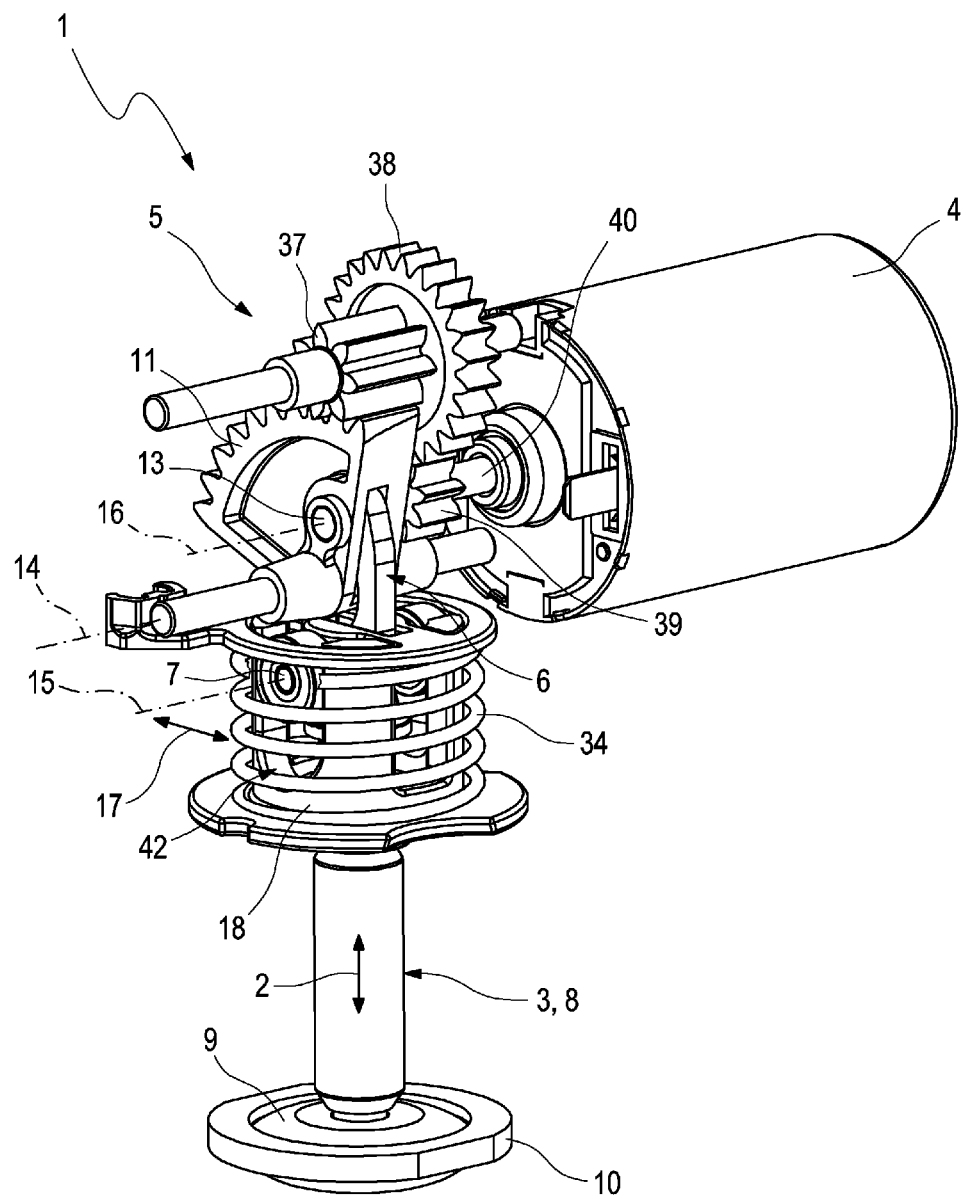
FIG. 1 schematically shows an isometric view of an actuating drive.

According to FIGS. 1 to 6, an actuating drive 1, with the aid of which an actuating element 3 which can be adjusted bidirectionally according to a double arrow 2 can be driven, comprises an actuator 4 for generating drive forces, a force transmission arrangement 5 and a toggle lever 6. The actuator 4 is for example an electric motor. The force transmission arrangement 5 is a toothed gear system in the example. The toggle lever 6 is connected in an articulated manner to the actuating element 3 by means of a first toggle lever joint 7. In the embodiment shown in FIGS. 1 to 3, the actuating element 3 is by way of example a valve element 8, which has a valve body 9 and adjusts the same relative to a valve seat 10. The actuating drive 1 can for example be used in an exhaust recirculating valve for an exhaust recirculating device of an internal combustion engine, in particular in a motor vehicle. The valve element 8 is then driven to control a cross section through which flow can pass in order to set an exhaust recirculation rate of the exhaust recirculation device by means of the lift of the valve element 9. Alternatively, it is likewise possible to equip an exhaust turbocharger with this actuating drive 1, for example to operate a valve element of a wastegate valve, with which a bypass which connects a high-pressure side to a low-pressure side of the turbine of the exhaust turbocharger can be controlled. Furthermore, it is possible in another exhaust turbocharger application to use the actuating drive 1 to operate a variable turbine geometry which has adjustable guide vanes for controlling an inlet cross section of a turbine wheel of the turbine of the exhaust turbocharger.

The force transmission arrangement 5 connects the actuator 4 to the toggle lever 6 for the purpose of force transmission. To this end, the force transmission arrangement 5 has an output element 11 arranged on the output side, which is mounted pivotably on a support housing section 12 of the actuating drive 1. The toggle lever 6 is connected in an articulated manner to this output element 11 by means of a second toggle lever joint 13. A pivot position of the output element 11 is translated or converted by the toggle lever 6 into a lifting movement of the actuating element 3 by means of the selected positioning of a pivot axis 14 of the output element 11 relative to joint axes 15, 16 of the toggle lever joints 7, 13.

Figure 2:
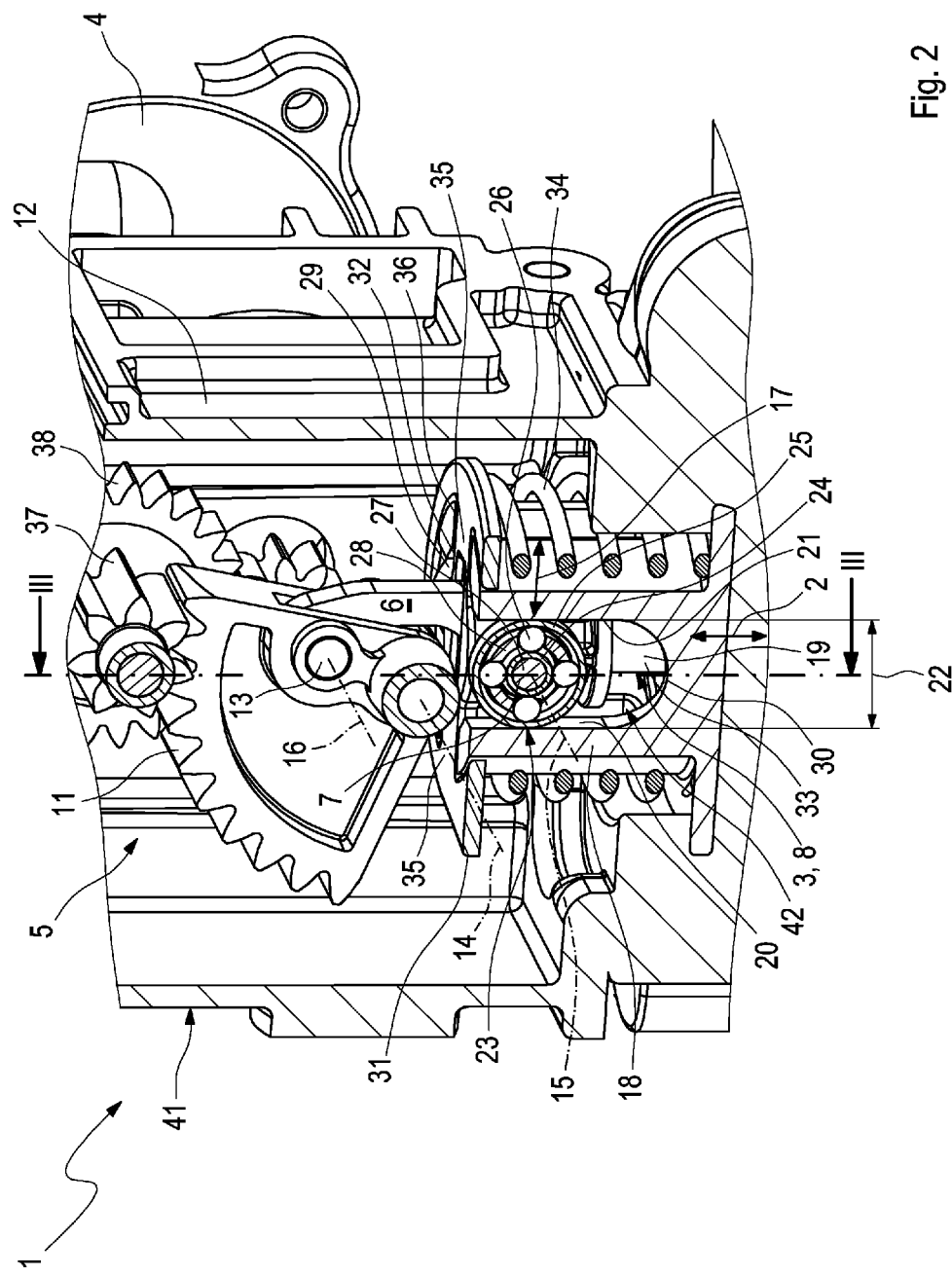
FIG. 2 schematically shows a sectional view of the actuating drive in the region of a toggle lever corresponding to section lines II in FIG. 3, FIG. 3 schematically shows a sectional view as in FIG. 2, but in a different sectional plane corresponding to section lines III in FIG. 2, FIG. 4 schematically shows an isometric view of the actuating drive in another embodiment, FIG. 5 schematically shows an enlarged detail view of the actuating drive of FIG. 4 in the region of a transverse support, FIG. 6 schematically shows a simplified longitudinal section through the actuating drive in a further embodiment.
Figure 3:
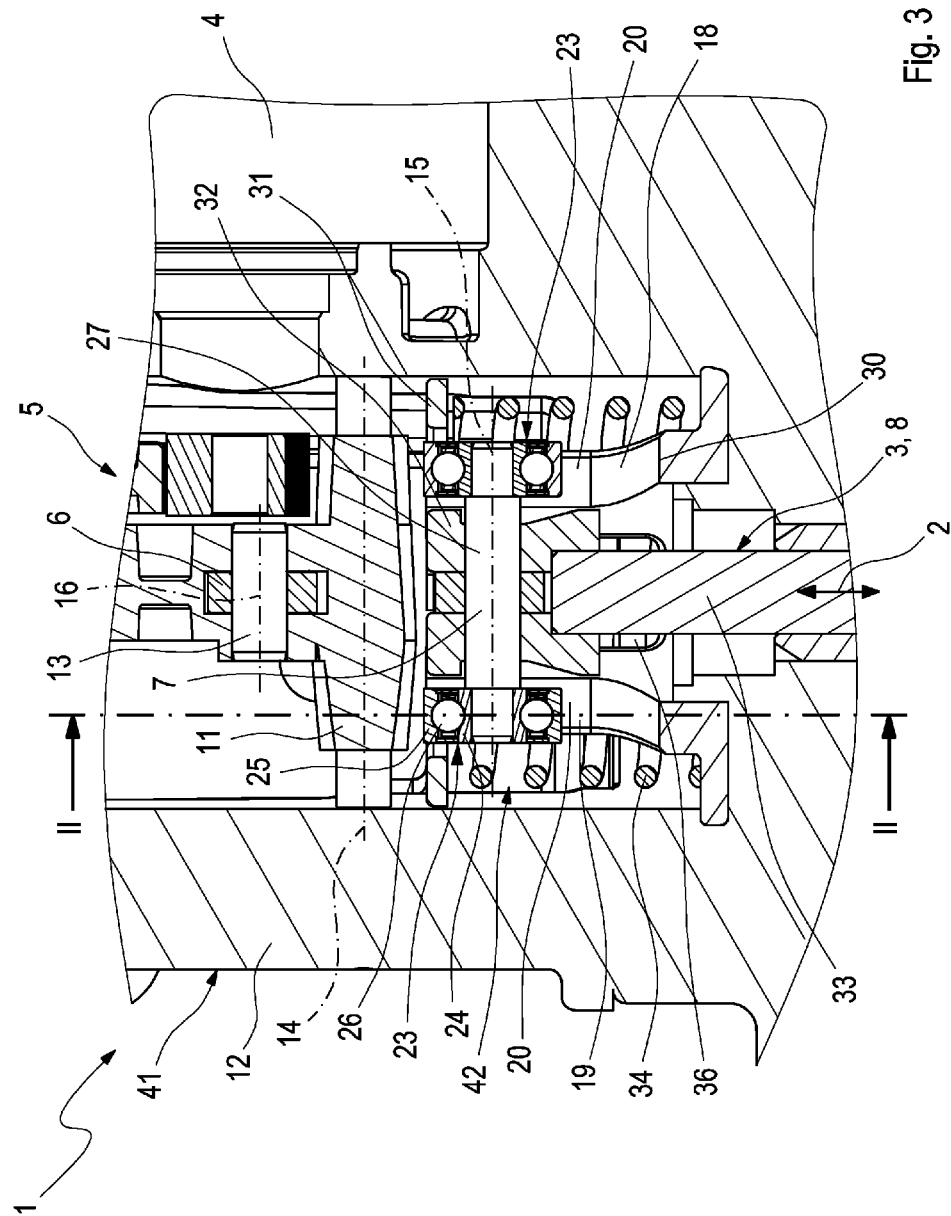

The toggle lever 6 or the actuating element 3 is supported on a guiding housing section 18 of the actuating drive 1 in a supporting direction 17 indicated by a double arrow with the aid of a transverse support 42. The supporting direction 17 is oriented transversely to the movement direction 2 of the actuating element 3. Transverse forces which are introduced into the first toggle lever joint 7 by the toggle lever 3 and are oriented transversely to the movement direction 2 can thereby be supported on the guiding housing section 18. The actuating element 3 is then in this respect decoupled from these transverse forces. In the example of FIGS. 1 to 3 and in the example of FIGS. 4 and 5, this transverse support 42 is provided in the region of the first toggle lever joint 7.

The two joint axes 15, 16 of the two toggle lever joints 7, 13 expediently run parallel to the pivot axis 14 of the output element 11. Furthermore, these joint axes 15, 16 and the pivot axis 14 run perpendicularly to the linear movement direction 2 of the actuating element 3. The supporting direction 17 is then aligned perpendicularly to the movement direction 2 and perpendicularly to the joint axes 15, 16 or perpendicularly to the pivot axis 14.

As can be seen particularly clearly in FIG. 2, the guiding housing section 18 in the embodiment shown in FIGS. 1 to 3 has two guiding track sections 20, 21 which run parallel to the movement direction 2 of the actuating element 3 at least on one side of an adjustment region 19 of the first toggle lever joint 7. The two guiding track sections 20, 21 have a distance 22 from each other. A guiding body 23 can slide or roll on these guiding track sections 20, 21. This guiding body 23 is arranged in a stationary manner in relation to the first toggle lever joint 7. In the example shown here, such a guiding body 23 is arranged in each case on two diametrically opposite sides of the adjustment region 19 in a stationary manner with respect to the first toggle lever joint 7, to which two mutually opposite, parallel guiding track sections 20, 21 are likewise assigned. The two guiding body/guiding track section pairs are basically mirror-symmetrical.

In the preferred embodiment shown here, the respective guiding body 23 is formed as a rolling bearing. Alternatively, the guiding body 23 can also be a roller. Rolling bearings or rollers roll on at least one guiding track section 20, 21.

If the guiding body 23 is formed as a rolling bearing, it has an inner ring 24, an outer ring 25 and a plurality of rolling bodies 26. The inner ring 24 is connected in a rotationally fixed manner to the first toggle lever joint 7 or to a first joint shaft 27 of the first toggle lever joint 7. The outer ring 25 rolls on at least one of the guiding track sections 20, 21. The rolling bodies 26, in this case balls, are arranged between the inner ring 24 and the outer ring 25 and allow play-free rolling of the outer ring 25 on the inner ring 24. The rolling bodies 26 can also be positioned relative to each other by means of a cage 28.

The distance 22 provided between the guiding track sections 20, 21 is greater than an outer diameter 29 of the guiding body 23 or of the rolling bearing or of the outer ring 25. This ensures that the guiding body 23 is always in contact with only one of the two guiding track sections 20, 21.

Owing to the kinematics present in this case between the output element 11 and the toggle lever 6, the respective guiding body 23 rolls along one guiding track section 20, which is arranged on the left in FIG. 2, during transmission of compressive force between the toggle lever 6 and the actuating element 3. During transmission of tensile force between the toggle lever 6 and the actuating element 3, the respective guiding body 23 is supported along the other guiding track section 21, which is shown on the right in FIG. 2. In the embodiment shown here, the two guiding track sections 20, 21 are connected to each other by a connecting track section 30, as a result of which a cohesive guiding track is produced, which is substantially U-shaped according to the sectional view which can be seen in FIG. 2. The respective guiding body 23 can then expediently slide or roll along this connecting track section 30 at a turning point or dead point of the adjustment movement of the actuating element 3 during the transition between the transmission of compressive force and the transmission of tensile force. Consequently the guiding body 23 changes from one guiding track section 20 to the other guiding track section 21 at this turning point or dead point.

As already explained above, the first toggle lever joint 7 has a first joint shaft 27 or toggle joint shaft 27. The toggle lever 6 is connected in an articulated manner to the actuating element 3 in the first toggle lever joint 7 by means of this toggle joint shaft 27. This first joint shaft 27 expediently projects beyond the actuating element 3 at least on one side and bears the respective guiding body 23, expediently the inner ring 24.

The actuating element 3 is also equipped with a plate 31 in the region of the first toggle lever bearing 7. This plate 31 can in particular be integrally formed on an actuating element head 32, which is connected in a suitable manner, e.g. by screw fastening or crimping or by means of a welded connection or the like, to an actuating element rod 33. The first toggle lever joint 7 is formed on the actuating element head 32, as a result of which a particularly high functional density is produced in the region of the first toggle lever joint 7.

Furthermore, a restoring spring 34 is provided, which is supported on the plate 31 on one side and on the guiding housing section 18 on the other side. The restoring spring 34 drives the actuating element 3 in the movement direction 2 into an output position of the actuating element 3. The restoring spring 34 thereby takes any play out of the force transmission arrangement 5. For example, the restoring spring 34 is formed as a compression spring which drives the actuating element 3 by means of the plate 31 when in the raised or upper output position or upper dead point position.

The plate 31 is in this case ring-shaped and connected to the actuating element 3 or to the actuating element head 32 by means of two diametrically opposite webs 35. The plate 31, webs 35 and actuating element head 32 in particular form a unit formed integrally from one piece. The webs 35 are each guided laterally in a guiding gap 36 on the guiding housing section 18. The guiding housing section 18 thus forms in particular a type of cage, which has two diametrically opposite guiding track section pairs 20, 21 on one side and offset by 90° thereto, two diametrically opposite guiding gaps 36.

The webs 35 engage through the associated guiding gap 36. Consequently, the first toggle lever joint 7 is arranged on the inside of the guiding housing section 18, while the restoring spring 34 is arranged on the outside of the guiding housing section 18. The webs 35 are also oriented parallel to the supporting direction 17 in this case.

The output element 11 is in this case formed as a toothed element or as gearwheel segment, which extends for example in an arc-shaped manner over approximately 90°. The output element 11 meshes with a small gearwheel 37, which is connected in a rotationally fixed manner to a large gearwheel 38. The terms "small" and "large" relate to the diameter and number of teeth of the gearwheels 37, 38. The large gearwheel 38 then meshes with a pinion 39 which is small compared thereto and is connected in a rotationally fixed manner to a drive shaft 40 of the actuator 4. A very effective gear reduction can thereby be realised overall, so the actuator 4 can be operated at a comparatively high speed in order to produce high actuating forces at the actuating element 3 at low power.

In the example shown here, the guiding housing section 18 and the supporting housing section 12 are integrally formed on an actuating drive housing 41 of the actuating drive 1.

Figure 4:
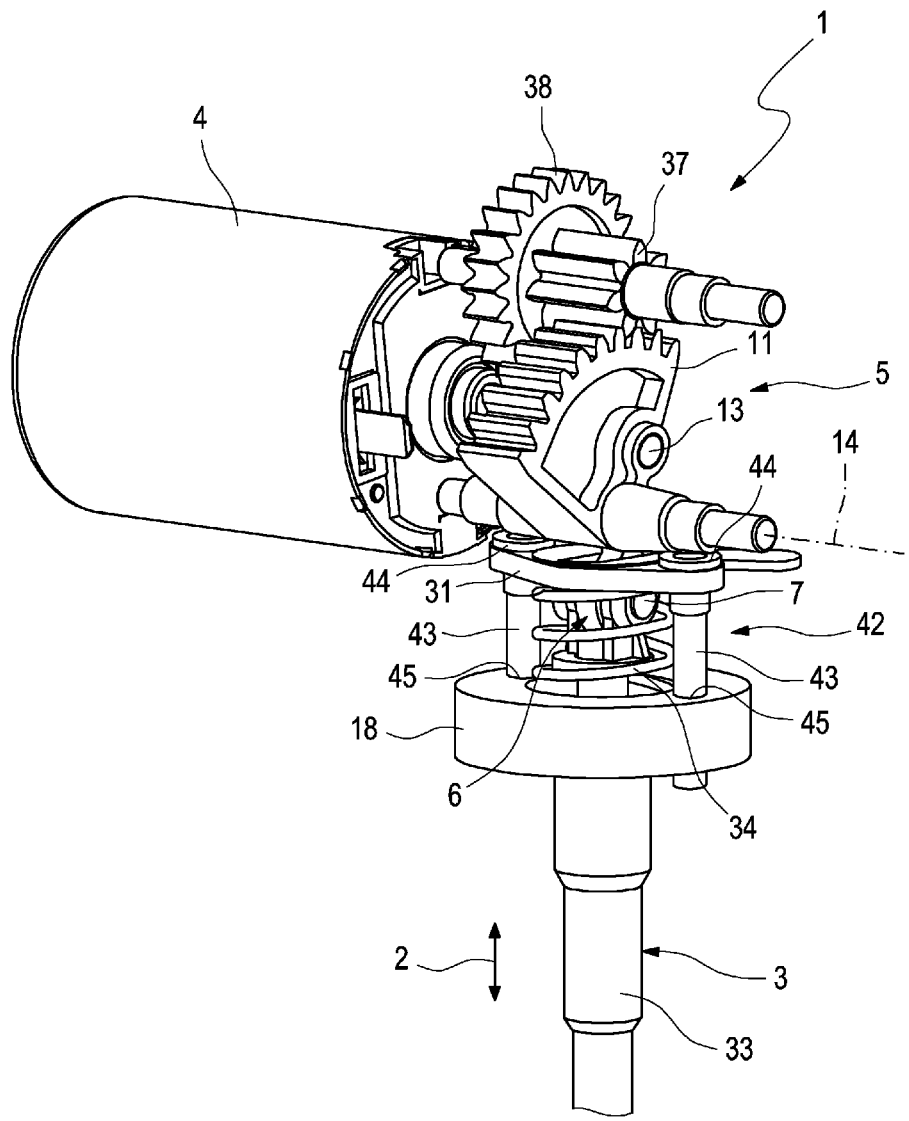
Figure 5:
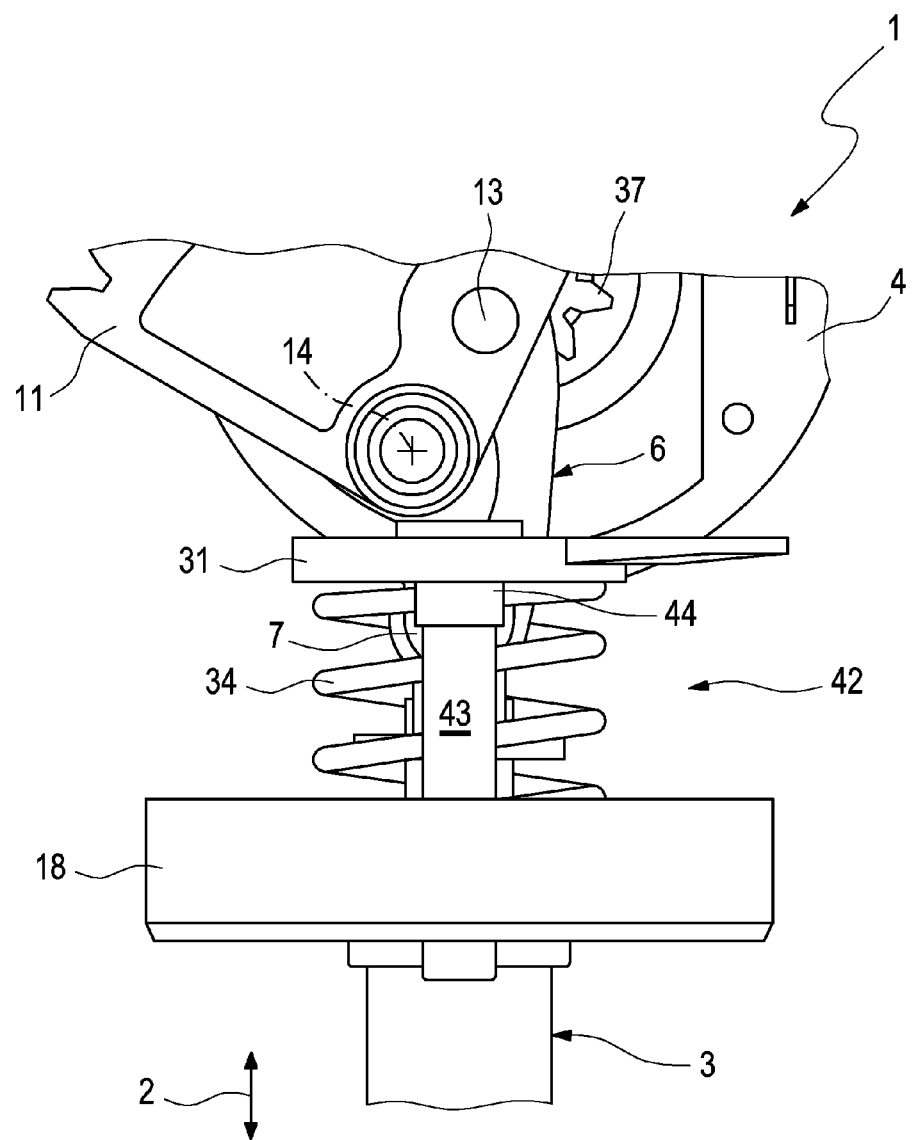

In the embodiment shown in FIGS. 4 and 5, the transverse support 42 is realised with at least two guiding pins 43 which are arranged in a distributed manner in the circumferential direction in relation to the movement direction 2 and support the plate 31 on the guiding housing section 18 in a guided manner parallel to the movement direction 2. In the example shown, two guiding pins 43 are provided, which are arranged diametrically opposite each other. It is clear that more than two guiding pins 43 can also be provided. In the example, the guiding pins 43 are each mounted such that they can be adjusted in a guided manner parallel to the movement direction 2 in a guiding bushing 44. The guiding bushings 44 are arranged fixedly on the plate 31. At their ends at a distance from the guiding bushings 44, the guiding pins 43 are each held and/or arranged such that they can be adjusted in a guided manner in a pin opening 45, which is formed for this purpose on the guiding housing section 18.

Figure 6:
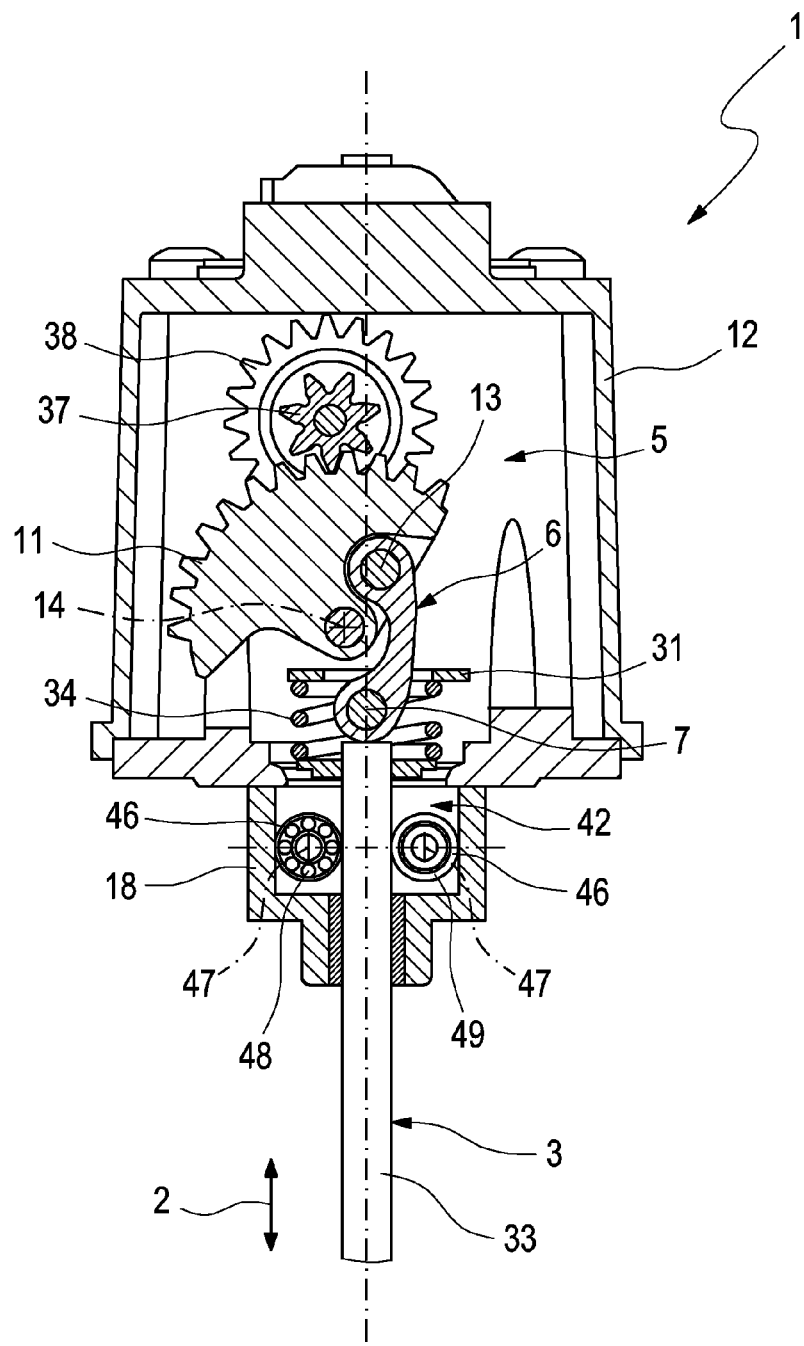

In the embodiment shown in FIG. 6 the transverse support 42 comprises at least one rolling body bearing 46 or roller bearing 46. The respective bearing 46 is arranged on the guiding housing section 18 and is supported directly on the actuating element 3. In the example of FIG. 6, the transverse support 42 takes place distally and in the diagram below the first toggle joint 7, that is, at a distance from the toggle lever 6. In the example, at least two rolling body bearings 46 or roller bearings 46 are also provided, which are arranged in a distributed manner in the circumferential direction in relation to the movement direction 2. There are preferably 2 or 3 or 4 bearings 46. The respective rolling body bearing 46 or roller bearing 46 has a rotation axis 47. Rolling bodies 48 (FIG. 6, left) of the rolling body bearing 46 rotate about this rotation axis 47 when the actuating element 3 moves in its movement direction 2. Alternatively, a roller 49 (FIG. 6, right) of the roller bearing 46 rotates about the rotation axis 47 when the actuating element 3 moves in its movement direction 2. The respective rotation axis 47 is oriented transversely to the movement direction 2.

The invention claimed is:

1. An actuating drive for a bidirectionally adjustable actuating element, comprising:
    an actuator for producing drive forces,
    a toggle lever pivotally connected to the actuating element by way of a first toggle lever joint,
    a force transmission arrangement connecting the actuator to the toggle lever,
    an output-side output element of the force transmission arrangement mounted pivotably on a supporting housing section of the actuating drive,
    wherein the toggle lever is pivotally connected to the output element by way of a second toggle lever joint, and
    a transverse support supporting at least one of the toggle lever and the actuating element on a guiding housing section in a supporting direction oriented transversely to a linear movement direction of the actuating element,
    wherein the guiding housing section is fixedly coupled to the supporting housing section of the actuating drive and the transverse support is adjustable relative to the guiding housing section along the linear movement direction.

2. The actuating drive according to claim 1, wherein the transverse support is arranged in a region of the first toggle lever joint.

3. The actuating drive according to claim 1, wherein each of the first and second toggle lever joints include a joint axis, wherein each joint axis and a pivot axis of the output element run parallel to each other and perpendicularly to the linear movement direction of the actuating element, wherein the supporting direction runs perpendicularly to the movement direction and perpendicularly to the joint axis.

4. The actuating drive according to claim 1, wherein the guiding housing section has two guiding track sections on at least one side of an adjustment region of the first toggle lever joint, the track sections running parallel to the movement direction of the actuating element and defining a distance between each other, a guiding body arranged within the distance and configured to slide therein, further wherein the guiding body is arranged in a stationary manner in relation to the first toggle lever joint.

5. The actuating drive according to claim 4, wherein the guiding body is formed as a bearing including at least one of a rolling body bearing and roller bearing and is configured to roll on at least one of the guiding track sections, wherein the bearing has an inner ring connected to the first toggle lever joint and an outer ring configured to roll on at least one of the guiding track sections, and wherein the bearing includes rolling bodies arranged between the inner ring and the outer ring.

6. The actuating drive according to claim 4, wherein the distance between the two guiding track sections is greater than an outer diameter of the guiding body to define a gap between the guiding body and at least one guiding track section.

7. The actuating drive according to claim 6, wherein the guiding body is supported along one of the guiding track sections during transmission of compressive force between the toggle lever and the actuating element and is supported along the other guiding track section during transmission of tensile force between the toggle lever and the actuating element.

8. The actuating drive according to claim 4, wherein the two guiding track sections are connected to each other by way of a connecting track section to form a cohesive, U-shaped guiding track, wherein the guiding body is configured to slide along the connecting track section at a turning point of the adjustment movement of the actuating element during the transition between compressive force transmission and tensile force transmission and wherein the support of the guiding body changes from one guiding track section to the other guiding track section.

9. The actuating drive according to claim 5, wherein the toggle lever in the first toggle lever joint is connected to the actuating element by way of a first joint shaft, wherein the first joint shaft projects from at least one side and bears the inner ring of the guiding body.

10. The actuating drive according to claim 4, wherein the two guiding track sections and the guiding body are provided on two diametrically opposite sides of the adjustment region of the first toggle lever joint.

11. The actuating drive according to claim 1, wherein the actuating element is connected fixedly to a plate in the region of the first toggle lever joint, and wherein the plate is spaced a distance away from the guiding housing section in relation to the movement direction of the actuating element.

12. The actuating drive according to claim 11, further comprising a restoring spring supported on the plate on one side and on the guiding housing section on the other side, the restoring spring configured to drive the actuating element into an output position.

13. The actuating drive according to claim 12, wherein the plate is integrally formed on an actuating element head of an actuating element rod.

14. The actuating drive according to claim 13, wherein the plate is ring-shaped and connected to at least one of the actuating element and the actuating element head of the actuating element by way of two diametrically opposite webs each guided laterally in one guiding gap on the guiding housing section.

15. The actuating drive according to claim 13, wherein the first toggle lever joint is formed on the actuating element head.

16. The actuating drive according to claim 14, wherein the webs engage through the guiding gaps and the first toggle lever joint is arranged on the inside of the guiding housing section and the restoring spring is arranged on the outside of the guiding housing section.

17. The actuating drive according to claim 14, wherein the webs are oriented parallel to the supporting direction.

18. The actuating drive according to claim 11, wherein the transverse support includes at least two guiding pins distributed around the actuating element in the circumferential direction in relation to the movement direction, and wherein the at least two pins extend parallel to the movement direction of the actuating element and adjustably support the plate on the guiding housing section in a guided manner parallel to the movement direction.

19. The actuating drive according to claim 18, wherein at least one of the guiding pins is adjusted in a guided manner parallel to the movement direction in a guiding bushing arranged on the plate.

20. The actuating drive according to claim 18, wherein at least one of the guiding pins is supported and adjusted in a guided manner in a pin opening on the guiding housing section.

21. The actuating drive according to claim 1, wherein the actuator is an electric motor.

22. The actuating drive according to claim 1, wherein the force transmission arrangement is configured as a gear system.

23. The actuating drive according to one of claim 1, wherein the output element is a toothed element.

24. The actuating drive according to claim 1, wherein the guiding housing section and the supporting housing section are integrally formed on a rapid drive housing.

25. The actuating drive according to claim 1, wherein the transverse support has at least one bearing arranged on the guiding housing section and supported on the actuating element, wherein the bearing is at least one of a rolling body bearing and a roller bearing.

26. The actuating drive according to claim 25, wherein the at least one bearing includes a plurality of bearings arranged in a distributed manner in the circumferential direction in relation to the movement direction.

27. The actuating drive according to claim 25, wherein the at least one bearing has a rotation axis about which rolling bodies of the rolling body bearing rotate and which is oriented transversely to the movement direction.

28. An exhaust recirculating valve for an exhaust recirculating device of an internal combustion engine, comprising:
  a valve element configured to control a cross section through which flow can pass and further configured to set an exhaust recirculation rate of the exhaust recirculating device based on a lift adjustment of the valve element, and
  an actuating drive configured to bidirectionally drive the valve element, the actuating element drive including:
    an actuator for producing drive forces;
    a toggle lever pivotally connected to the valve element via a first toggle lever joint;
    a force transmission arrangement connecting the actuator to the toggle lever, the force transmission element including an output-side output element mounted pivotally on a supporting housing section of the actuating drive, wherein the output element is pivotally connected to the toggle lever via a second toggle lever joint; and
    a transverse support supporting at least one of the toggle lever and the valve element on a guiding housing section in a supporting direction, the supporting direction oriented transversely to a linear movement direction of the valve element;
    wherein the guiding housing section is fixedly coupled to the supporting housing section of the actuating drive and at least partially surrounds the valve element circumferentially with respect to the linear movement direction of the valve element, and wherein the transverse support is adjustable relative to the guiding housing section along the linear movement direction.

29. An exhaust turbocharger for an internal combustion engine, comprising:
- a wastegate valve having a valve element configured to control a bypass connecting a high-pressure side to a low-pressure side with a turbine of the exhaust turbocharger, wherein an actuating drive is configured to bidirectionally drive the valve element, the actuating drive including:
- an actuator for producing drive forces;
- a toggle lever pivotally connected to the valve element at a first toggle lever joint via a first joint shaft;
- a force transmission arrangement connecting the actuator to the toggle lever, the force transmission element including an output-side output element mounted pivotally on a supporting housing section of the actuating drive, wherein the output element is pivotally connected to the toggle lever via a second toggle lever joint; and
- a transverse support supporting at least one of the toggle lever and the valve element on a guiding housing section in a supporting direction, the supporting direction oriented transversely to a linear movement direction of the valve element, wherein the transverse support includes at least one guiding body;
- wherein the guiding housing section is fixedly coupled to the supporting housing section of the actuating drive and at least partially surrounds the valve element circumferentially with respect to the linear movement direction of the valve element, the guiding housing section including two guiding track sections on at least one side of an adjustment region of the first toggle lever joint, the track sections running parallel to the movement direction of the valve element and defining a distance between each other, wherein the guiding body is arranged within the distance and configured to slide therein, further wherein the guiding body is mounted in a stationary manner on at least one end of the first joint shaft so that the transverse support is adjustable relative to the guiding housing section along the linear movement direction.

* * * * *